Aug. 18, 1942.  W. L. ROWE  2,293,629
TELEGRAPH SYSTEM
Filed Aug. 2, 1940

INVENTOR
W. L. Rowe
BY
ATTORNEY

Patented Aug. 18, 1942

2,293,629

UNITED STATES PATENT OFFICE 2,293,629

TELEGRAPH SYSTEM

William Luck Rowe, Allentown, Pa., assignor to American Telephone and Telegraph Company, a corporation of New York Application August 2, 1940, Serial No. 350,051

9 Claims. (Cl. 178—3)

This invention relates to telegraphy, and particularly to a system for the automatic transmission of telegraph code practice material over test wires for the training of student operators in receiving such material, the transmission being effected and controlled by the well-known teletypewriter tape transmitter.

In the operation of a telegraph system it is necessary to train certain members of the maintenance and operating forces to receive readily telegraph messages transmitted by the Morse code. The present invention resides in a system for automatically transmitting messages in that code over circuits of a telegraph system to which is connected apparatus by which the persons to be trained may receive such messages. The invention is characterized by means for automatically changing the speed of transmission, at predetermined times, in order to give experience to the student operator in receiving at various speeds and in adjusting himself to receive at changed speeds. The invention is further characterized by means to signal the attendant at the transmitting office whenever necessary to attract his attention for the purpose of stopping the transmitter when the tape, by which the signals are transmitted, is approaching the end of its run, or for other reasons.

Figure 1:
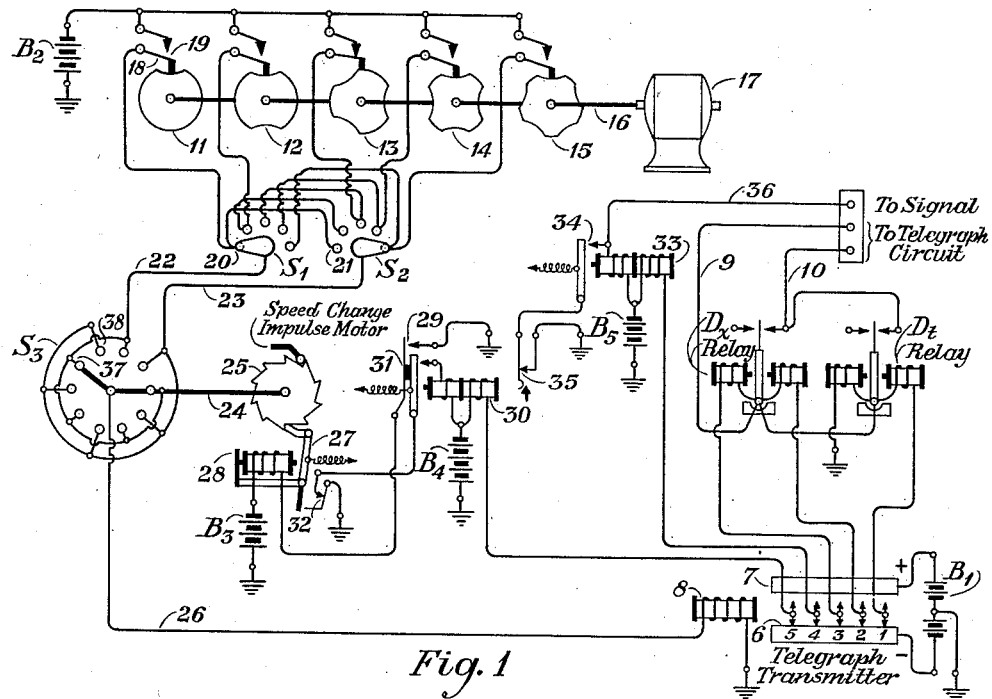
Figure 2:
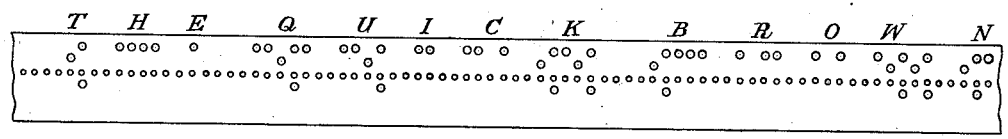
Figure 3:
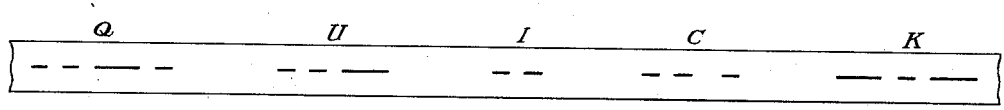

This invention will be clearly understood from the following description, when read in connection with the attached drawing, of which Figure 1 shows schematically a form of embodiment of the invention; Fig. 2 shows a section of transmitter tape punched in the manner hereinafter described to effect the transmission of Morse signals by the apparatus shown in Fig. 1; and Fig. 3 shows the Morse signals produced upon the tape of a printer connected to such test lines. It is to be understood, however, that the apparatus for the training of student operators is intended to translate the electrical impulses into sound by which the messages may be read by those operators.

Referring to Fig. 1, a telegraph transmitter is shown at the lower right-hand corner of the figure. It comprises the front and back contact bars 6 and 7 which are connected to opposite terminals of the battery $B_1$, the midpoint being grounded. Resting upon the front bar are the contact arms 1 to 5, inclusive. Those contact arms are adapted to be moved by the magnet 8 which is connected to the battery $B_2$ in a manner which will later be described in detail. Contact arm 1 is connected through the windings of the polarized relay $D_t$ to a common return or ground.

Another relay, designated $D_x$, similar if not identical with $D_t$, is connected between the contact arms 2 and 3. The armatures of those relays are bonded and connected by conductor 9 to one side of the telegraph circuit to which is connected the apparatus for the training of student operators in the reception of messages transmitted by code impulses. The marking contacts of those relays are also bonded and connected by conductor 10 to the other side of the telegraph circuit so that the operation of either relay will close the telegraph circuit. The relays used are true polar— that is, they are constructed with free armatures so that when an armature is thrown against either contact it will maintain contact in that position until a current impulse in a reversed direction is applied to the winding. Tape perforated, as shown in Fig. 2, when fed through the telegraph transmitter, will cause the transmission of signals over the telegraph circuit in a manner more fully described hereinafter.

As shown in the upper portion of the figure, a plurality of cams, designated 11 to 15, inclusive, is connected to a shaft 16 driven by a constant speed motor 17. Cam 11 has therein a single serrature of a predetermined length, into which falls the arm 18 for the purpose of opening the contact 19. The arm 18 is connected to contacts 20 and 21 of the speed selector switches $S_1$ and $S_2$. The arms of those switches are connected by the conductors 22 and 23 to alternate contact points of the speed change switch $S_3$, and the arm of $S_3$ is mechanically connected by a shaft 24 to the rotating element 25 of the speed change impulse motor. The arm of $S_3$ is electrically connected by conductor 26 to the winding of the magnet 8 that controls the stepping of the tape through the telegraph transmitter. The element 25 of the speed change motor is moved by the armature 27 of the magnet 28 whenever the magnet is energized by the closing of contact 29 of the control relay 30. That relay has two windings, one of which is connected to the arm 5 of the transmitter and the relay will operate whenever that arm makes contact with the bar 7. Relay 30 will then lock up through the circuit extending from battery $B_4$, through contacts 31 and 32 to ground. At the same instant a circuit will be closed from battery $B_3$, winding 28 and contact 29 to ground. This will attract the armature 27 and will rotate the moving element 25 of the speed change impulse motor thereby causing the arm of the switch $S_3$ to move from, say, contact 37 to contact 38. This will cause a change in speed of the tape transmitter, in a manner that will later be fully described.

Relay 33 is a double wound relay, one of the windings being connected between the battery B₅ and the contact arm 4 of the transmitter. Its other winding is connected between the battery B₅ and the contact of the relay and also to conductor 36 which extends to a signaling device for producing an alarm to attract the attendant's attention. Upon operation, relay 33 locks up through its contact 34 and the contact of a push button 35 by which it may later be released. The operation of relay 33 serves to operate a signal, not shown, that may be connected to conductor 36.

The cams connected to the cam shaft have, as shown, a progressively increasing number of serratures as viewed from left to right, cam 12 having two serratures, cam 13 having three, cam 14 having four, and cam 15 having five. All serratures have the same length so that the time interval of the marking contact, which is controlled by the width of the serration, is always the same regardless of which cam controls the speed of transmission at any instant.

Let it be assumed that a tape is being fed through the telegraph transmitter and that the tape is perforated consecutively only in position 1. The arm 1 will therefore make a succession of contacts with the bar 7 and the relay D$_t$ will follow the movements of the arm. The relay is so poled that the armature swings to the marking contact upon the movement of the transmitter arm to the bar 7 and that will cause the transmission of a marking impulse over the telegraph circuit 10. During such transmission the armature of the D$_x$ relay rests against the spacing contact.

If the tape is perforated only in position 2, contact 1 will maintain the D$_t$ relay in spacing position but the arm 2 on its upward movement will be connected to the opposite pole of the battery B₁ from that to which the arm 3 is connected. Accordingly, current will flow through the D$_x$ relay and cause its armature to move to one of its contacts. The winding is poled so that the armature seeks the marking contact. When the arm 2 falls back in contact with the bar 6, current ceases to flow though the D$_x$ relay but, due to the characteristics of that relay, as previously stated, the armature remains in marking position. If a perforation appears alone in position 3, the corresponding transmitter arm will make contact with the bar 7 and current will flow through the D$_x$ relay in a direction opposite to that previously stated. This will cause the armature to move to its spacing position. If the tape is perforated in the progressive order of 2—3, 2—3, successive marking signals will be transmitted to the telegraph circuit, the marking interval of which will be equivalent in length to that of a dot for any of the cams plus the spacing interval for the particular cam and a slight modicum due to the inherent motional characteristics of the transmitter. The spacing will be equal to that of the dot plus the space between dots for the particular cam used. If the tape is perforated in the progressive order of 2—1/3 etc., the D$_t$ relay will be thrown to marking position at the same time that the D$_x$ relay is released and the D$_t$ relay will sustain the marking interval for a period equal to the time interval of a normal dot and the spacing interval will be correspondingly shortened to a value equal to dot spacing for the particular driving cam in use.

These longer marking intervals represent well proportioned conventional Morse telegraph "T" dashes to match up with the respective dot frequencies transmitted by the various cams.

The dash signals can be lengthened for the "L" and "Cipher" signals of the Morse telegraph code by repeating the #2 perforation before ending with the 1/3 perforation. Likewise spacing intervals can be varied and transmitted at will by advancing blank tape when either or both of the relays have completed transmission of marking impulses.

In order to perforate the tape for the transmission of Morse code signals, a modified teletypewriter perforator is used. The keyboard contains only three special keys above the regular space bar. One of the key-levers to be known as #1 is formed so that its selecting ward depresses selecting bar #1, another key-lever is formed so that its ward depresses selecting bar #2, and is to be known as #2 key; likewise the third key to be known as #3 is formed so that its selecting wards depress selecting bars 1 and 3. The space-bar is formed so that its ward depresses selecting bar #6 which corresponds to the "Blank tape" function in a standard keyboard for teletypewriter use. When so desired, two additional keys may be added and arranged for perforating positions 4 and 5 respectively for the features of automatic speed change and end-of-tape alarm, as will presently be described.

The operator, in preparing the tape, records the spaces on the space-bar, the dots on key #1, and the dashes on #2 and #3. The keys may be placed in various positions in the keyboard layout, but the arrangement selected should be the one which will best suit the propensity of an average operator. The operator can add individual characteristics to the transmission by varying the length of the dashes and the proportionate spacing used between characters, words, and in the spaced characters themselves; he can mimic careless hand-sending or so-called "good sending" from an automatic key in which the spacing is badly exaggerated and the dot signals overran, by over-dotting with the #1 key and ill-timing the dashes and spaces. He cannot, however, add that parasitic characteristic of shortening the marking interval of the dot nor can be modulate the dot frequency by shortening the unit space as it occurs individually or within the characters. Neither can he shorten the marking interval of the unit (T) dash. It is these latter characteristics which have always been troublesome if not difficult in transmission over telegraph circuits, and for this reason the lack of facility for reproduction is considered desirable.

Whenever the operator, in preparing the tape, desires to change the speed of transmission he perforates the tape in the fifth position. When the tape thus perforated is fed through the transmitter, the arm 5 makes the contact with the bar 7 and relay 30 is energized. That relay locks through contacts 31 and 32 and at the same time it closes contact 29 which grounds the magnet 28 and attracts the armature 27. By means of the pawl connected to that arm, the moving element 25 is advanced a distance corresponding to the movement of the armature 27. The shaft 24 is rotated and the arm of the switch S₃ is moved to the next contact point on that switch. Assuming the arm to be moved from contact 37 and to contact 38, and also assuming the switches S₁ and S₂ to be in the position shown, the cam 15 would then be connected into the circuit between the battery B₂ and the magnet 8 which controls the stepping of the tape through the transmitter. Since the cam 15 has five serratures as compared with one serrature of cam 11, which was previously connected into the circuit of the magnet 8, the stepping circuit will be opened and closed five times as rapidly as it was previously, and the speed of transmission of signals will be correspondingly increased. By adjusting the position of the switches S₁ and S₂, other speed combinations can be obtained.

When the end of the tape has been nearly reached in the course of preparing it, it is, of course, desirable to provide some means by which an indication of that condition will be given to the attendant at the telegraph office when the tape is being run through the transmitter. Accordingly, the tape is perforated in the fourth position. When that perforation passes through the transmitter, the arm 4 moves against the bar 7 and energizes the alarm relay 33 which operates and locks through contacts 34 and 35. Upon its operation it, in turn, operates a signal which may be audible or visual or both, and that signal continues to operate as long as the alarm relay remains locked up. The attendant will thereupon remove from the transmitter the tape that has run its course and place thereon another punched tape, at the same time, he will operate the push-button of contact 35 which, by removing the ground, releases the alarm relay and also the signal. The tape shown in Fig. 2 shows perforations in the first three positions, but it is to be understood that perforations in the fourth and fifth positions would be made as described above.

The impulses transmitted over the telegraph circuit will produce dot and dash Morse signals as indicated upon the tape shown in Fig. 3. These impulses would, of course, operate standard Morse receiving equipment by which training in the reception of those signals may be given to the various persons intended to be trained.

The two conditions, namely uniform marking and variable spacing, produced in the transmitter output circuit makes this device well suited for transmission of telegraph messages in any signal code at different speeds and without distortion, from the same tape, previously prepared on a perforating device in accordance with the proper translation of the message into placement of the perforations in the tape so as to produce in the output of the transmitter the correct telegraph signal characters.

It should be noted that the tape as perforated has not lost any of its normal teletypewriter transmission characteristics, so that it may be transmitted into a normal teletypewriter circuit locally or to remote points with standard apparatus; in the local circuit or at the remote points reperforators can be connected so as to reproduce the transmitting tape for various purposes.

While this invention has been described as applied to a wire telegraph circuit, it is obviously equally applicable to a radio telegraph circuit without altering the principle of the invention.

Although the invention has been described as embodied in a particular form, it is capable of embodiment in other forms without departing from the spirit and scope of the appended claims.

What is claimed is:

1. A telegraph system comprising an automatic tape transmitter having a perforated tape therein, means controlled by the transmitter to translate the perforations into Morse telegraph signals, and means also controlled by tape perforations to vary in predetermined fashion the rate of transmission of such signals.

2. A telegraph system comprising an automatic tape transmitter having a perforated tape adapted to pass therethrough, a pair of polar relays controlled by the said transmitter, a telegraph line connected to said relays into which code telegraph impulses will be sent by said relays and means connected to said line to translate said impulses into audible signals.

3. A telegraph system comprising an automatic tape transmitter having a perforated tape adapted to pass therethrough, a pair of polar relays controlled by the said transmitter, a telegraph line connected to said relays into which code telegraph impulses will be sent by said relays, means connected to said line to translate said impulses into audible signals and means controlled by the perforated tape to vary at predetermined intervals the rate of transmission of the said telegraph impulses.

4. A telegraph system comprising an automatic tape transmitter, a pair of polar relays controlled by the said transmitter adapted to transmit Morse telegraph signals, and means also controlled by the said transmitter to vary at predetermined intervals the rate at which the signals are transmitted.

5. In a system for automatically transmitting Morse telegraph signals, the combination with a teletypewriter tape transmitter having a tape therein perforated in three positions, a pair of polar relays, one controlled by one arm of said transmitter to transmit dot impulses and the other relay controlled by the joint action of two other arms of said transmitter to transmit dash impulses, and a circuit connected to the armatures of the said relays to which the said impulses may be applied.

6. A system for automatically transmitting telegraph code signals which comprises a teletypewriter tape transmitter, means controlled by the said transmitter to apply code signaling impulses to a telegraph line, means connected to said line and responsive to the said impulses to audibly reproduce the said signals, and means controlled by the tape transmitter to vary at predetermined intervals the rate of transmission of the said impulses.

7. A telegraph system comprising an automatic tape transmitter having a perforated tape adapted to pass therethrough, a pair of polar relays responsive to the action of the said transmitter to apply code telegraph signals to a telegraph line, means associated with the said transmitter to step the tape therethrough, and means responsive to perforations in the said tape to change the rate of stepping at predetermined intervals, the said means comprising a plurality of cams having serratures thereon, the number of serratures on a given cam differing from that on the adjacent cams, and switching means to connect either of a pair of cams into the circuit controlling the said transmitter.

8. A telegraph system comprising an automatic tape transmitter having a perforated tape adapted to pass therethrough and to operate selectively a plurality of contact members, means controlled by certain of said members to transmit characters in the Morse telegraph code or its equivalent corresponding to the code of the said tape, means controlled by another of said members to vary in a predetermined fashion the rate at which the said perforated tape is fed through the said transmitter.

9. In a device for automatically transmitting Morse telegraph signals for training purposes, the combination with a pair of polarized relays, of a tape-operated telegraph transmitter to control the said relays, the said tape being so perforated as to cause the relays to transmit dot and dash signal impulses, and means also controlled by the perforated tape to vary the rate of stepping of the said transmitter, the said varying means including a speed change impulse motor controlled by the said tape, a plurality of cams each having one or more serratures therein, the said cams being adapted to open and close a contact in the circuit of the stepping magnet of the said telegraph transmitter, and a selecting switch controlled by the said motor to connect a predetermined cam whereby the relative rate of operation of the stepping magnet may be varied.

WILLIAM L. ROWE.